Patented July 13, 1954

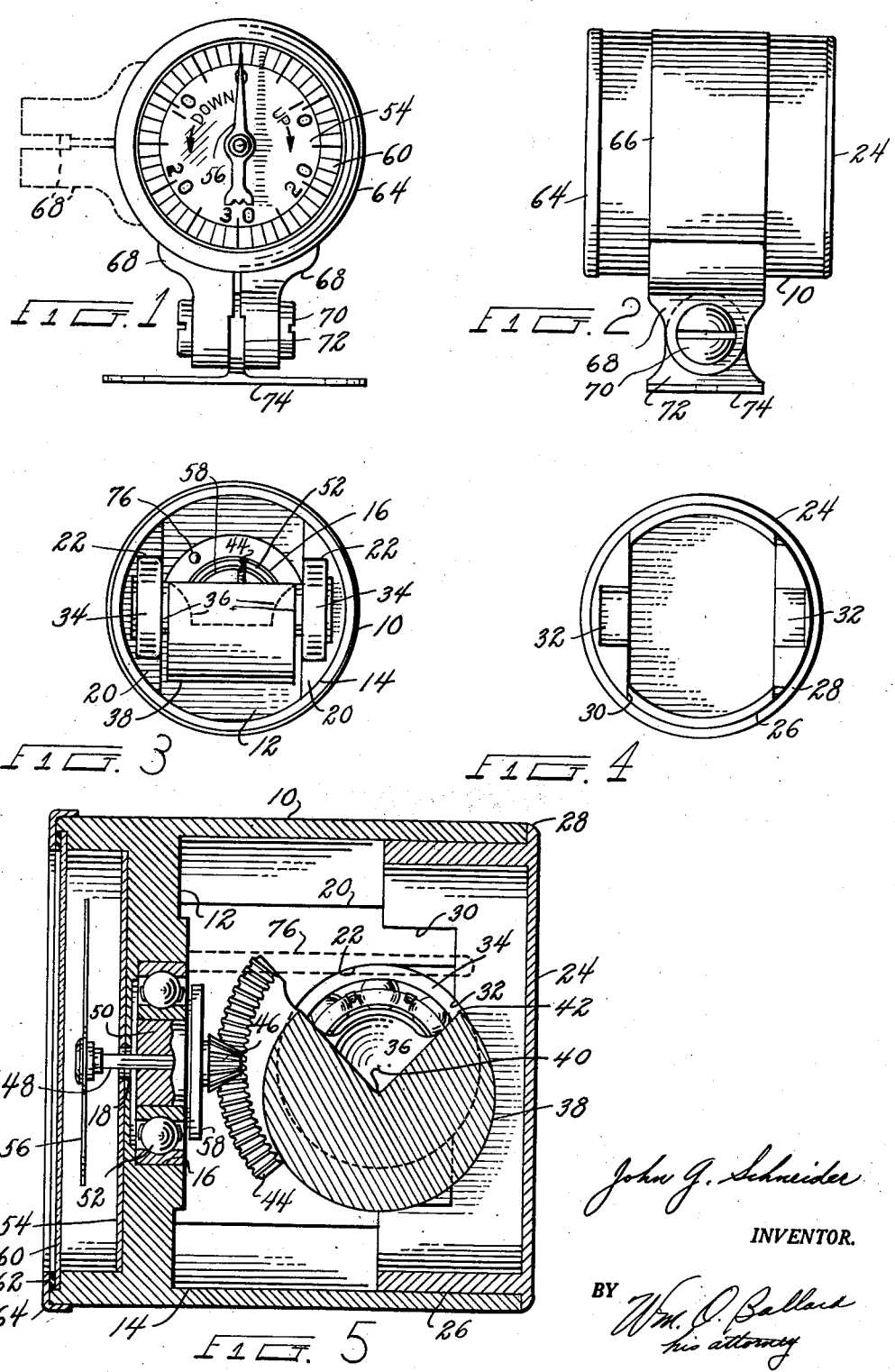

2,683,314

UNITED STATES PATENT OFFICE 2,683,314

GRADIENT INDICATOR

John G. Schneider, Toledo, Ohio

Application March 16, 1949, Serial No. 81,803

2 Claims. (Cl. 33—215)

This invention relates to gradient indicators.

An object of this invention is to provide a mass swingable in one plane in relation to its carrier and having an indicator operating in a different plane, with a transmission mechanism therebetween.

An additional object of this invention is to provide a hermetically sealed housing for the entire mechanism having a transparency or window therein for viewing the indicator whereby the instrument may be factory tested and sealed with all the lubrication therein necessary for the normal life of the device.

Another object of the invention is to provide a housing and cooperating parts, designed to interfit and reduce to a minimum the number of individual parts necessary for an accurate device.

And a primary object of the invention is to provide a gradient indicator which is promptly and accurately responsive to all the movements for which it is designed to indicate with an even and steady action and substantially non-responsive to most vibrations and other external influences foreign to the action it is intended to register.

While the device is primarily intended to be mounted on vehicles for indication to the passengers of the incline or decline along which the vehicle is traveling, it is adapted to be used as a direct reading gradient indicator under any set of circumstances.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a front elevation of the instrument showing the dial and cooperating pointer;

Fig. 2 is a side view of the device from the right of Fig. 1;

Fig. 3 is a rear view of the device with the cover removed;

Fig. 4 is an elevation of the interior of the cover element as removed from the housing end shown in Fig. 3; and Fig. 5 is a longitudinal section through the device.

The primary housing 10 is herein shown as a cylindrical element open at each end and having an integral partition 12 thereacross intermediate the interior or chamber 14.

The partition 12 is provided with a centrally disposed circular seat 16 in the rear thereof and an axial aperture 18 from said seat to the front. Diametrically opposed ribs 20 extend rearwardly from the partition and are provided with opposing semi-circular seats 22 in their rearward termini.

A cover 24 is provided for the rear of the instrument and has skirt 26 nested within the housing 10 with flange 28 abutting the rearward periphery of the element 10. This skirt is provided with cut-out regions 30 to interfit with the ribs 20 and seats 32 to coact with the seats 22 to complete circular seats for a pair of opposed roller bearings 34.

The configuration of the cover not only allows a hermetic seal for the rear when such cover is pressed into position but also correctly positions the seat portions 32 in registry with the seat portions 22 to form the mounts for and axially aligning the bearings 34.

These bearings 34 mount oppositely extending trunnions 36 which in turn mount a cylindrical mass or pendulum weight 38. While the trunnions 36 are coaxial with the bearings, the axis 40 of the cylinder 38 is spaced therebelow. As for example, a 2" diameter mass has its axis spaced ¼" below the axes of the trunnions and the bearings and a 1" diameter mass has its axis spaced ⅛" below the axes of the trunnions, and this mass has a sector cut-out region 42 of approximately 85°. This gives a very sensitive yet stable swing of the mass relative to the movement of the housing. In other words, the response is quick, positive and definite without flutter or response to vibrations independent of actual housing tilt.

Fixed to the outer surface of the cylinder 38 is a gear segment 44 eccentric of the cylinder axis but diametrically disposed on the axes of the trunnions. This gear section is in mesh with bevel pinion 46 on shaft 48 which shaft has fixed collar 50 thereon rotatable in roller bearing 52 nested in the seat 16. The shaft 48 extends through aperture 18, through and beyond dial 54 which is mounted on the front side of the partition 12, and mounts pointer 56 on its forward terminus. This pointer as rotated through its cycle as controlled by the swing of the mass 38 indicates by a direct reading in degrees, rise and fall in a given length as feet in a mile or other desirable indicia carried by the dial.

The dial shaft 48 also has a disk weight 58 fixed thereon between the pinion 46 and bearing 52. This serves as an additional stabilizer against pointer response due to jars and foreign vibrations and aids in a smooth steady movement thereof for easy reading. The pointer is encased behind window 60 mounted with a washer 62 and ring seal element 64 which permits observance of the pointer yet hermetically seals its forward encasing region and the housing 10.

Suitable mountings may be used to initially set the instrument at zero yet attach the device to any available support. A desirable form of mounting is herein shown including a main housing embracing band 66 having its termini attached to blocks 68 drawn toward each other by a screw device 70 to clamp offset 72 therebetween, which in turn is carried by a plate 74 to be attached to some suitable support. As the screw device is loosened the housing may be turned relatively within the band 66 and the blocks 68 rocked as to the offset 72. This provides a universal movement to initially set the housing and a tightening of the screw device 70 locks the instrument in position.

A pin 76 may be mounted on the partition 12 and extend over the mass member 38 so that the swing in either direction is limited and hence the pointer 56 cannot swing beyond its maximum reading.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. A gradient indicator comprising a cylindrical housing element providing an open front and rear ended chamber therein, an integral partition intermediate the length of said chamber having a central seat facing the rear and an axial aperture therethrough, a first bearing in said seat, a pair of diametrically disposed ribs extending from the direction of the partition toward the rear each having a seat in the terminus thereof, a bearing in each seat, a cover for said rear having a skirt extending into the chamber and provided with cut-out regions embracing the termini of said ribs and registering seats with the rib provided seats for longitudinally locking said bearings therein, a pair of axially aligned trunnions in said bearings intersecting the axis of the first bearing, a weight mass mounted by said trunnions having its major portion aligned along an axis parallel to and laterally spaced from the axes of said trunnions, a dial on the opposite side of the partition from said first bearing, a shaft mounted by said first bearing and extending forwardly and rearwardly therefrom, a pointer on the forward end of said shaft and a bevel gear on the rearward end of said shaft, and a bevel gear section mounted on said mass in mesh therewith, said gear section having its center coincide with the axes of said trunnions.

2. In a gradient indicator, a tubular housing element providing a chamber therein with an integral partition intermediate its length having a central aperture therethrough, a pair of axially aligned bearing seats in the surface of said chamber on one side of said partition, a bearing providing cage nested in each seat, a swingable mass mounted between the bearings and having a pair of oppositely extending integral trunnions supported in said bearings, a cover for closing the end of the chamber remote from said partition, said cover embodying extensions engaging the trunnions mounting bearings to lock said bearings therein, a bearing providing cage nested in the side of the partition facing said mass, said partition having a centrally apertured dial on its opposite side, a shaft mounted by said latter bearing and extending in one direction through the apertures in said partition and in said dial and extending in the other direction toward said mass, a pointer on the shaft end adjacent said dial, and a transmission mechanism between the other end of said shaft and said mass.

References Cited in the file of this patent

UNITED STATES PATENTS

| Number | Name | Date |
|---|---|---|
| 420,242 | Nielsen | Jan. 28, 1890 |
| 546,501 | Zanger | Sept. 17, 1895 |
| 1,020,733 | Wilson | Mar. 19, 1912 |
| 1,170,466 | Switzer | Feb. 1, 1916 |
| 1,199,938 | Sorensen | Oct. 3, 1916 |
| 1,290,793 | Shemeley | Jan. 7, 1919 |
| 1,367,519 | Sharpe | Feb. 1, 1921 |
| 1,477,545 | Day | Dec. 18, 1923 |
| 1,503,672 | Thompson | Aug. 5, 1924 |
| 1,552,487 | Johnston | Sept. 8, 1925 |
| 2,030,068 | Martin | Feb. 11, 1936 |
| 2,362,616 | Cloud | Nov. 14, 1944 |
| 2,436,417 | Bogen | Feb. 24, 1948 |
| 2,464,911 | White | Mar. 22, 1949 |

FOREIGN PATENTS

| Number | Country | Date |
|---|---|---|
| 331,857 | Great Britain | 1930 |